US012800725B2

(12) United States Patent
Wohlgenannt et al.

(10) Patent No.: US 12,800,725 B2
(45) Date of Patent: Nov. 17, 2026

(54) LIDAR DEVICE WITH SPATIAL LIGHT MODULATORS

(71) Applicant: HEXAGON INNOVATION HUB GMBH, Heerbrugg (CH)

(72) Inventors: Rainer Wohlgenannt, Klaus (AT); Jürg Hinderling, Marbach (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 740 days.

(21) Appl. No.: 18/200,513

(22) Filed: May 22, 2023

(65) Prior Publication Data

US 2023/0375672 A1 Nov. 23, 2023

(30) Foreign Application Priority Data

May 23, 2022 (EP) .................................... 22174897

(51) Int. Cl.
*G01S 7/481* (2006.01)
*G01S 7/4865* (2020.01)
(Continued)

(52) U.S. Cl.
CPC .......... *G01S 7/4816* (2013.01); *G01S 7/4865* (2013.01); *G02B 26/0833* (2013.01); *G01S 17/89* (2013.01)

(58) Field of Classification Search
None
See application file for complete search history.

(56) References Cited

U.S. PATENT DOCUMENTS 10,247,811 B2 4/2019 Clifton
10,976,415 B1 * 4/2021 Gagne .................. G01S 7/4817
(Continued)

FOREIGN PATENT DOCUMENTS

CN 102710902 A 10/2012
CN 108873181 A 11/2018
(Continued)

OTHER PUBLICATIONS

Vu et al. "Design and Evaluation of Uniform LED Illumination Based on Double Linear Fresnel Lenses"; Appl. Sci. 2020, 10, 3257; 2020 (Year: 2020).*

(Continued)

*Primary Examiner* — Yuqing Xiao
*Assistant Examiner* — Clint Thatcher
(74) *Attorney, Agent, or Firm* — Maschoff Brennan

(57) ABSTRACT

A multichannel Light Detection And Ranging device with a dense array of equal spatial light modulator elements such as a digital micromirror device. The modulator array is arranged in a focal plane of a receiving optics between the receiving optics of a receiver unit and detectors. Each spatial light modulator element individually provides a first spatial modulation state and a second spatial modulation state, the two states differing in light redirection. Only in the first modulation state light from the receiving optics is redirected via a respective modulator element in a targeted manner towards a detector. The receiver unit comprises a dense array of juxtaposed optical wedges in between the modulator array and the detectors. Each wedge covers a different area of the modulator array and the refractive planes of the wedges are differently oriented.

18 Claims, 4 Drawing Sheets

(51) Int. Cl.
*G01S 17/89* (2020.01)
*G02B 26/08* (2006.01)

(56) References Cited

U.S. PATENT DOCUMENTS

| | | | | |
|---|---|---|---|---|
| 2012/0200858 | A1* | 8/2012 | Pruijmboom | G01B 9/02092 356/477 |
| 2017/0357000 | A1* | 12/2017 | Bartlett | G01S 7/4814 |
| 2020/0256960 | A1 | 8/2020 | LaChapelle et al. | |
| 2021/0033711 | A1 | 2/2021 | Helsloot et al. | |
| 2021/0302589 | A1* | 9/2021 | Takeuchi | G01V 3/12 |
| 2022/0260677 | A1* | 8/2022 | Yang | G01S 17/931 |
| 2024/0248211 | A1* | 7/2024 | Bruza | G02B 26/0833 |

FOREIGN PATENT DOCUMENTS

| | | | |
|---|---|---|---|
| CN | 113703000 | A | 11/2021 |
| EP | 3 460 519 | A1 | 3/2019 |
| EP | 3 705 913 | A1 | 9/2020 |
| EP | 3 833 999 | A1 | 6/2021 |

OTHER PUBLICATIONS

Dudley et al. "Emerging Digital Micromirror Device (DMD) Applications"; SPIE Proceedings vol. 4985; 2003 (Year: 2003).*

Cai et al. "Wedge Prism Approach for Simultaneous Multichannel Microscopy"; Sci Rep 9, 17795; 2019 (Year: 2019).*

Extended European Search Report dated Nov. 11, 2022 as received in Application No. 22174897.3.

* cited by examiner

LIDAR DEVICE WITH SPATIAL LIGHT MODULATORS

BACKGROUND

The present disclosure relates to a Light Detection And Ranging (LIDAR) device with a dense array of spatial light modulators in the receiving optical path.

Light Detection and Ranging (LIDAR), is a remote sensing method that uses light e.g. in the form of a pulsed laser to measure ranges (variable distances) to one or more object surfaces in a field of view. A LIDAR device is for instance disclosed in EP3460519 A1. In detail, light is transmitted towards the object and single photodetectors or arrays of photodetectors such as PIN photodiodes, avalanche photodiodes (APDs), single-photon avalanche diodes (SPADs), multipixel single photon counter (MPPC), or silicon photomultipliers (SiPMs) receive reflections from objects illuminated by the light, and the time it takes for the reflections to arrive at various sensors in the photodetector array is determined. This is also referred to as measuring time-of-flight (ToF). The spatial position of a surface point is acquired in each case by the distance to the targeted surface point being measured by the laser and this measurement being linked to items of angle information of the laser emission, e.g. a rapidly settable deflection element, for example, a scanning mirror (sweeping or rotating mirror) or a refracting optical component, according to a defined scanning grid in order to vary the transmission direction of the distance measuring beam, for example, with respect to one or more independent spatial directions, whereby a three-dimensional measuring or scanning region can be acquired. The spatial position of the acquired point can be determined from these items of distance and angle information and, for example, a surface can be surveyed in an ongoing manner.

Well known applications are scanning ranging for mobile entities such as airplanes, drones or cars, for instance use in driver assistance systems, for detecting other objects or measuring air turbulences. In the field of autonomously driving vehicles, the roads to be traveled are typically acquired in advance and imaged in a model. For this purpose, for example, vehicles equipped with scanners are used, which scan and map the relevant region and therewith provide geometric data of the world around the car at a very high resolution.

As a preferred application of LIDAR, a LIDAR is e.g. embodied as or is part of theodolite or total (scan) station or as an airborne LIDAR, can be used to survey many different settings such as construction sites, industrial facilities or any other applicable setting for example in order to sample a cloud of 3D points (so called point cloud) within a coordinate system, representing the object's surface points. Additionally, a camera may be associated with a laser scanner and may be configured to capture images associated with the setting being scanned. Further measuring tasks of scanning measuring devices are, for example, the monitoring of an environment, for example, in the context of a warning or monitoring system for an industrial manufacturing plant.

The required large field of view of the receiver being at least 100-1000 times the size of the laser beam has several drawbacks. For example, the solar background noise is strongly increased and limits the detection threshold for weak return pulse signals. Thus the transmission power needs to be increased for achieving a sufficient signal to noise ratio (SN), whereby however eye-safety limits have to be taken into account. Typically, the readout time of a detector depends on the size of the detector. Thus, the response time of larger detectors is increased, i.e. limiting the overall scanning speed and/or the scanning resolution, and the detector bandwidth and manufacturability is typically reduced. Additionally cost of detectors is increased and availability of large detectors is limited.

As an alternative to a LIDAR with a sweeping deflection element as described above, it is known to use a flash LIDAR system which scans by using multiple detectors. Each detector is aligned so that it only detects light coming from a certain direction. The amount of signal that can be received is determined by the area of the detector and the acceptance angle of the detector. The transmitted light from the LIDAR system illuminates all the objects (points) to be measured, while each detector only receives light from the objects that are in its field of view. One difficultly of the flash LIDAR system is finding a powerful laser source with high enough peak power that can illuminate the whole scene with a very short pulse of preferably less than 1 nanosecond. Due to this, the transmitted power may be limited by the capability of today's lasers, instead of being limited by laser eye safety limits.

Recently, there are LIDAR devices known, e.g. by EP3833999 A1 or U.S. Ser. No. 10/247,811 B2, that comprise in the receiving path an array of spatial light modulators such as a Digital Micromirror Device (DMD). A DMD is a two dimensional array of e.g. 4090×2160 or up to eight million modulator elements, each of which may be referred to as a DMD pixel, and arranged in a generally rectangular or other form. Each of the individual spatial modulator elements sees some small part of the field of view. In case of a DMD, each modulator element is a micromirror that is configured to be activated by a positive electrical signal (first modulation state/ON state) or activated by a negative electrical signal (second modulation state/OFF state) thousands of times per second by receiving electrical signals sent from a controller (e.g. a microcontroller or other processing unit). The electrical signals control a tilting mechanism of a corresponding modulator element such that for example tilting angles of +12° and −12° can be activated. Typically, there is also a third or deactivated state without electrical signal with a flat position of about 0° (undefined tilting position). In the first activated state, a tilt of an individual micromirror is configured to redirect received measurement light towards a detector. In a 2nd activated state, a tilt of the micromirror is configured such that light impinging on the micromirror is deflected away from the detector. In other words, when using the DMD in the receiving optical system, switching on and off different micromirrors corresponds to passing light through the optical system for detection or rejecting it. Hence, received light can be detected pixel-by-pixel, thus scanning the object surface point-by-point.

SUMMARY

It is an object of the present disclosure to provide an improved LIDAR device with an array of spatial light modulator elements on the receiving side.

The disclosure relates to a, particularly multichannel, Light Detection And Ranging (LIDAR) device for detection of a portion of a three dimensional environment, preferably within measurement ranges of above 100 m. The LIDAR comprises a transmission unit with a sequential (point or line like) or simultaneous (areal) pulse illumination source or sequential or simultaneous burst illumination source. Preferably, the illumination has a wavelength in the wavelength range between 1000 nm and 2000 nm, in particular has a wavelength of 1064 nm or 1550 nm.

Further, the device comprises a receiver unit with a receiving optics, multiple detectors for detection of received illumination light and feed of respective detection channels. Above that, it comprises a dense array of equal spatial light modulator elements (in the following also abbreviated as "modulator elements"), preferably a digital micromirror device (DMD). The array of spatial light modulator elements (in the following also abbreviated as "modulator array") is arranged in a focal plane of the receiving optics between the receiving optics and the detectors, whereby the spatial light modulators provide a first spatial modulation state and a second spatial modulation state each, the two states differing in light redirection, and the array of modulator elements and the detectors are arranged such that only in the first modulation state light from the receiving optics is redirected via a respective modulator element in a targeted manner towards a detector. An evaluation electronics evaluates signals of respective detection channels for distance determination based on the principle of time of flight.

The receiver unit comprises a dense array of optical wedges (in the following also abbreviated as "wedge array") in between the array of modulator elements and the detectors, whereby the wedges are juxtaposed with respect to the focal plane, each wedge covers a different area of the array of modulator elements and the refractive planes of the wedges are differently oriented, such that light coming from the array of modulator elements in the first modulation state is refracted area-wise in different refraction directions by the wedge array. Preferably, the detectors are spatially separated from each other according to a respective refraction direction each such that light of a respective modulator element area is receivable by a respective detector. The different wedges of the wedge array define domains on the array of modulator elements which addresses different regions of the receiving field of view (FOV) of the LiDAR.

In other words, the array of individual spatial modulator elements which in themselves provide equal spatial modulation in their first modulation state, is segmented in areas or domains of different light redirection by the array of different optical wedges. The different refraction resp. effective light direction allows for a spatial separation of the detectors. That is, the detectors need not to be placed densely juxtaposed to cover the dense modulator array/field of view. Though the detectors have gaps between them, the field of view can nevertheless be completely or gaplessly measured. In other words, the at least substantially dense, gapless or continuous modulator array can be mapped without loss to the non-dense, distributed, discontinuous or spaced field of detection provided by the detectors. For example, the receiving optics and the modulator array define a cohesive field of view (FOV) of at most 40°×30°, in particular of at most 20°×15°, which can be fully monitored by the detectors though they are spatially separated.

Preferably, the wedge array is monolithic, e.g. made from a single piece of glass or plastic, and/or the first optical element in the light path between modulator array and detectors. This includes that the wedge array is the only optical element in this part of the beam path. Alternatively, some sort of relay optics follows the wedge array.

As a preferred option, a respective detector is embodied as an avalanche photo diode (APD) and/or has a bandwidth of at least 100 MHz, in particular at least 1 GHz.

As an option, a photo sensitive area of a respective detector is (substantially) covering the same field of view as a respective modulator area or domain. That is, the area of spatial modulator elements allocated to a respective detector is geometrically equal or corresponding to the effective detection area.

As an alternative option, there are lens arrays e.g. as a part of a relays optics in the optical path after or downstream of the wedge array, each sublens of the lens array mapping the respective modulator area versus the center of the detector. Hence, the photosensitive area can be smaller than the respective area of the modulator domain resp. field of view part to be scanned therewith. In particular, a photosensitive area of a respective detector can be at least ten times smaller than the respective modulator area, whereby optionally the photo sensitive area has a diameter of at most 350 μm.

As an option, the LIDAR device comprises a camera with an image sensor for capturing one or more 2D-images, whereby in the second modulation state a respective modulator element directs light from the receiving optics to the image sensor. Hence, in this embodiment, the second spatial modulation state is used for generating e.g. an on-axis Intensity, Gray-Scale or RGB-image of the current field of view. This 2D-imageing can be done in parallel to a 3D-measurement, whereby only the individual pixels (modulator element) currently used for the 3D-measurement are lost in the 2D-image, which however is neglectable.

As another option, the device comprises means for light absorption such as a beam dump, e.g. a black glass plate, for absorbing light redirected by a modulator element in the second modulation state or a third or further modulation state. Hence, light reflected from the modulator elements not used for measurement can be absorbed which lowers the impact of unwanted straylight. Said third modulation state is for example in case of a DMD a parked position as a resting position.

Preferably, measurement channels of the LiDAR can be parallelized and therewith parallel detection for segments of the modulator array and therewith field of view can be enabled. That is, multiple or even all detection channels are optionally connected in parallel and the evaluation electronics is configured for parallel or simultaneous multiple distance determination. For example, in case of a certain number of modulator areas or domains (and according, equal number of wedges) and an according, equal number of allocated detection channels, an equal number of object points can be scanned in parallel as each spatial modulator element can be switched individual or independently and light redirected from a modulator element of each modulator area or segment of the modulator array can be detected independently.

As an option, instead of full illumination of the FOV (flash LIDAR), the transmission unit comprises means for emitting the illumination in form of multiple light fans spaced to each other, e.g. a grating or diffractive optical element, multiple line lasers or linear arrays of VCSEL. The light fans are oriented in accordance to lines of the modulators. That is, the illumination light is shaped to illuminate simultaneously or in direct sequence (sequential flash LIDAR) multiple distinct, spatially separated lines of modulator elements. Then, within every currently illuminated line, one or more of the modulator elements at once (e.g. one element of each currently illuminated modulator domain at a time for parallel detection) can be switched in the first state for light detection.

The present disclosure provides the advantage that the uniform field of light redirection provided by the dense arrangement of equal spatial light modulator elements as a modulator array is broken up by the optical wedge array. Instead, the wedges put out different, non-parallel light propagation directions for different regions or domains of the modulator array and hence regions of the measurement field of view. This allows for a flexible arrangement of detection optical paths and finally for a distributed arrangement of optical detectors.

This enables in particular the usage of photodetectors with limited photosensitive areas. For instance, an APD as a detector well fitted for wavelengths between 1000 and 2000 nm, in particular 1550 nm, has an insensitive border region around the photosensitive inner region. Hence, even if multiple APDs are packed as dense as possible, there are detection gaps inside the package caused by the insensitive border of each APD. In this case, this would mean the great disadvantage that the dense field of view provided by the dense i.e. gapless modulator array could not be covered without gaps.

Now to the contrary, the spreading of the field of view by the wedge array enables that an assembly of APDs can be arranged spatially separated but nevertheless densely covering the field of view. All received light is directed to a photosensitive region and no received light is directed to a dead border region. No “pixel” is lost without the need of relying on rimless detectors which may be not available or applicable in a LIDAR as demanded. An arrangement of multiple detectors is in particular advantageous for parallelization of LIDAR measurements.

In an alternative multichannel LIDAR device with an array of spatial light modulator elements, the LIDAR comprises a transmission unit with a sequential or simultaneous pulse or burst illumination source and a receiver unit with a receiving optics and a multichannel dense detection array, preferably in the form of an application-specific integrated detector array.

The dense detection array provides multiple closely neighbored or juxtaposed, but independent detection areas or regions. Each detection region covers an allocated area of the modulator array whereby the whole of the modulator area or the complete field of view is covered gaplessly by the whole of the detection zones, i.e. by the detection array. The dense detection array is for example preferably embodied as a monolithic structure for example as a dense array of MPPC (Multi Photon Pixel Counter) or SiPM (Silicon Photo Multiplier). Such an array of MPPC is e.g. provided on a single, monolithic and segmented chip. Said otherwise, each segment of the dense detection array is designed for detection of an allocated segment of the spatial modulator array and hence segment of the field of view.

The dense array of equal spatial light modulator elements, preferably embodied as a digital micromirror device, is arranged in a focal or imaging plane of the receiving optics between the receiving optics and the detection array. As in principle already described above, the spatial light modulator elements provide a first spatial modulation state and a second spatial modulation state each, the two states differing in light redirection and the modulator array and the detection array are arranged such that only in the first modulation state light from the receiving optics is redirected via a respective modulator in a targeted manner towards the detection array.

An evaluation electronics evaluates signals of respective detection channels for distance determination based on the principle of time of flight. Each detection area of the array or each segment individually feeds a detection channel. Therewith, multiple or preferably all detection channels can be evaluated simultaneously. Thus, received light from multiple or all segments or areas of the modulator array can be detected in parallel.

As each spatial modulator element can be switched individually or independently, a measurement or scan with each modulator segment or modulator region independent of the other regions is enabled by individually switching a pixel in each region and in sequence for the other pixels in each region until all pixels have been switched (i.e. each sub-field of view has been fully covered by and by). This sequence can be done in parallel for multiple or all regions, hence, multiple or all regions of the field of view as defined by the segmentation of the detection array can be scanned in parallel, therewith multiplying the measurement rate compared to single measurements. The more of said parallel detection regions are available, the higher the multiplication of the measurement can be/the more object points can be scanned in parallel. For example, with a detection array comprising n detection areas and accordingly parallel measurement channels and spatial modulator elements with a switch rate of the modulation state of m Hz, the measurement rate is n*m. A typical switching speed of a modulator element is 100 kHz, a LiDAR with nine parallel electronic detection channels yields thus a measurement rate of 9*100 kHz=0.9 MPoints per second.

As an option, the area of the detection array equals the area of the modulation array. Said otherwise, there is no effective optical magnification or minification but a 1:1 imaging.

In another alternative LIDAR device with an array of spatial light modulator elements, the LIDAR is a single channel LIDAR and comprises a transmission unit with a sequential or simultaneous pulse or burst illumination source and a receiver unit with a receiving optics and a single detector, for example a APD or MPPC, preferably designed for wavelengths between 1000 nm and 2000 nm.

Said dense array of equal spatial light modulator elements, preferably embodied as a digital micromirror device, is arranged in an image plane or a focal plane of the receiving optics between the receiving optics and detector. As in principle already described above, the spatial light modulator elements provide a first spatial modulation state and a second spatial modulation state each, the two states differing in light redirection and the modulator array and the detector are arranged such that only in the first modulation state light from the receiving optics is redirected via a respective modulator in a targeted manner towards the detector.

In between the modulation array and the detector, a relay optics comprising a lens array is arranged. The lens array is designed and arranged in such a way that each lens of the array maps a portion of the area of the spatial light modulator versus the center of the detector. Said otherwise, the light bundles redirected from the spatial modulator array are imaged to a reduced area in the detection plane. The diameter of the light bundle cross section is reduced at the photodetector e.g. by a factor of five or more. Hence, a detector with an accordingly—i.e. 25 times or more-smaller area than the area of the modulation array can be used, e.g. a high-speed small area detector like an APD with a diameter of 350 μm or 1.5 mm for a modulator area of 3 mm×3 mm.

Obviously, it is not required to scan the entire scene with the full resolution defined by the modulator array. Hence, as an option, only a reduced resolution is acquired by using only every n-th pixel of the modulator array to cover the whole field of view at a reduced resolution in order to achieve a higher acquisition speed. This can for example be used to get an overview over the entire scene. Another option is to scan a dedicated region of interest (ROI) of the scene by activating a subset of the modulator array at full resolution. Other constellations are possible as for example multiple spatially separated regions of interest at full resolution.

BRIEF DESCRIPTION OF THE DRAWINGS

In the following, the LIDAR devices will be described in detail by referring to exemplary embodiments that are accompanied by figures, in which.

DETAILED DESCRIPTION

Figure 1:
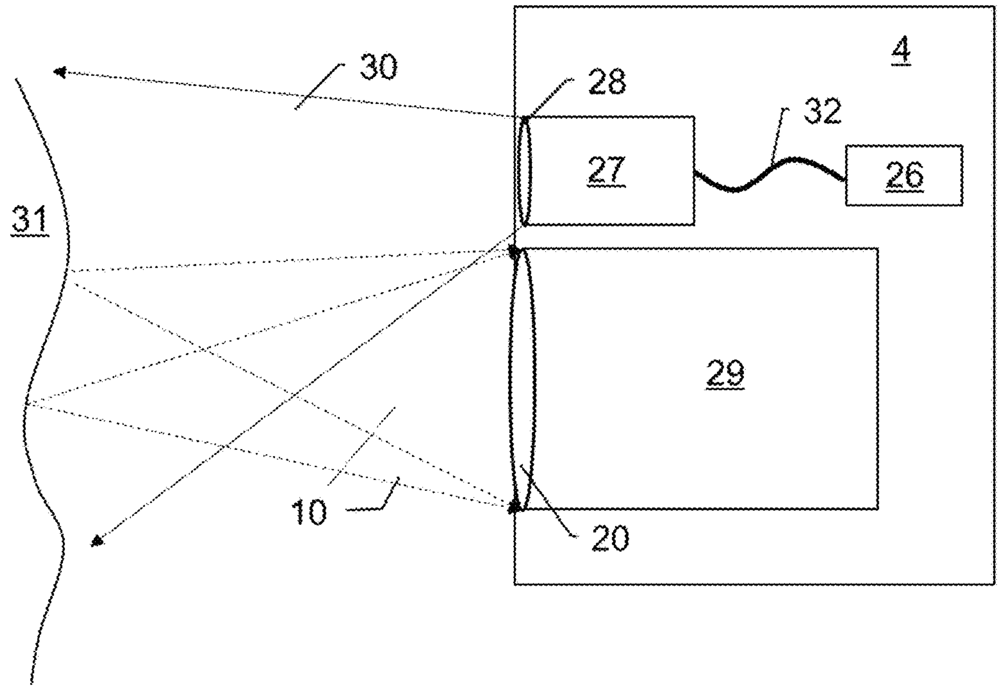
FIG. 1: illustrates in a 2D-cross sectional view a scheme of a light detection and ranging device (LIDAR)

FIG. 1 illustrates in a 2D-cross sectional view a scheme of a light detection and ranging device 4 (LIDAR) for scanning of an object 31, preferably for scanning ranges of 100 m or more. The LIDAR 4 comprises in the example a laser 26 as a radiation source, optionally amplified e.g. by an EDFA (Erbium-Doped Fiber Amplifier; not shown) and coupled to a light transmitter 27 by an optical fiber 32. Through a transmitting optics 28, the surface of the object 31 to be measured is illuminated with laser radiation modulated by single pulses or by a burst pulse series or a coded pattern of pulses 30. The wavelength is preferably in between 1000 nm and 2000 nm, for example 1550 nm. The object 31 can be illuminated in sequence, e.g. by using an oscillating or rotating mirror in the light transmitter 27. For example, such a steering mirror is embodied as a MEMS-mirror, e.g. for beam or light fan shift in one direction (1D) or two directions (2D). Alternatively, the surface is illuminated simultaneously e.g. by flash illumination using a highly divergent measurement beam or multiple light sources/emission points, e.g. a VSCEL-array. In particular, the complete field of view of a receiving unit 29 of device 4 is illuminated at once. Said receiving unit 29 comprises a receiving optics 20, e.g. of a pupil size of 20-30 mm, for receiving illumination light 10 reflected from different illuminated points the surface 31 as indicated in the figure. The receiver 29 comprises a spatial light modulator device (SLM) consisting of an array of spatial light modulator elements and is depicted in more detail in the following figures.

Figure 2:
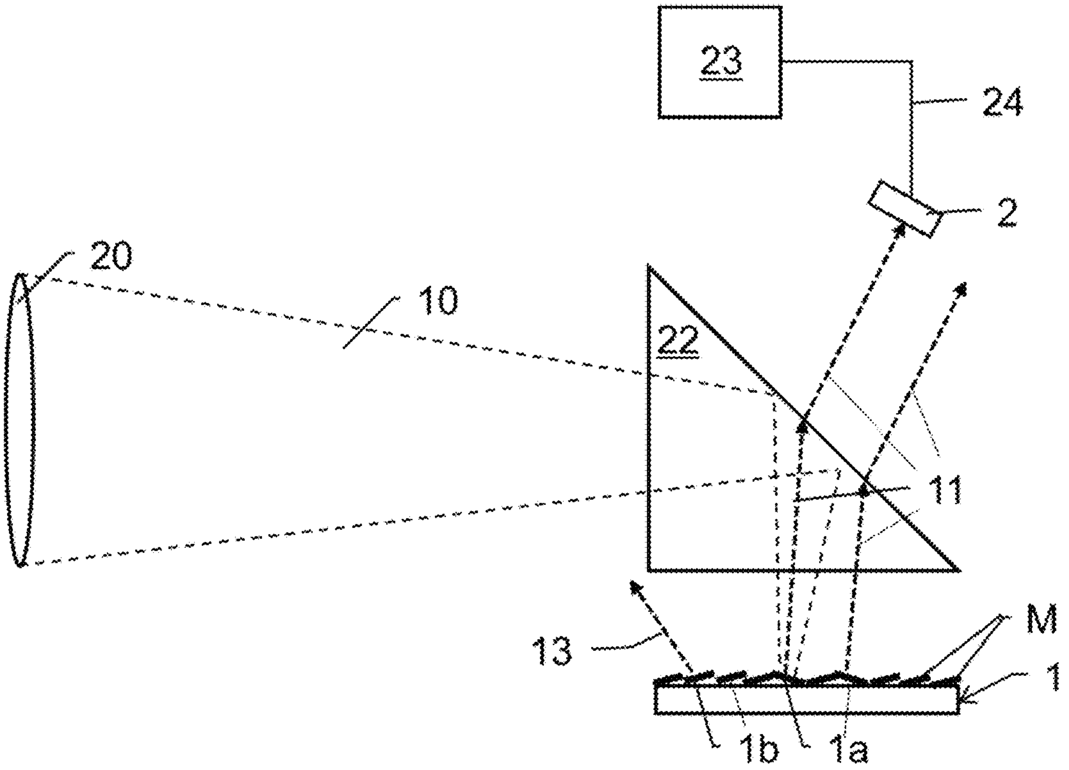
FIG. 2: illustrates schematically in a 2D-cross sectional view the working principle of the array of spatial light modulator elements of the LIDAR.

FIG. 2 illustrates schematically in a 2D-cross sectional view the working principle of the SLM working, e.g. in a reflective mode. It consists of an array 1 of spatially arranged deflecting mirrors M of a LIDAR. A receiving optics 20 receives radiation or measurement light 10, as said with pulse or burst modulation, reflected back from the surface of an object (not shown) the distance to object's surface points is to be measured. In the example, the received light 10 is led by a beam deflection element such as the prism 22 to the modulator array 1, arranged in the image or focal plane of the receiving optics 20, having a fixed focal length of e.g. 20-40 mm. There can be further optics, e.g. for chromatic correction such as another optical prism or wedge.

The modulator array (SLM) 1 is an array of, for example between 200 k pixels and 8 M pixels, individual equal spatial light modulator elements M, in the example embodied for spatially modulating by reflection. Using the SLM in reflection mode is favourable because of first its polarisation independent reflection and second its broad wavelength range, e.g. covering the wavelengths between 1000 nm and 2000 nm. The array 1 is dense i.e. it covers the field of the received light 10 in principle or ideally gaplessly, in a real modulator array 1 such as a Digital Micromirror device (DMD) substantially gapless i.e. almost without any gaps as e.g. tiny slits between the micromirrors M are unavoidable. Each micromirror M has for example a size of 10 to 20 μm and can be (actively switched) separately or independently of the other mirrors M in a first modulation state 1*a* or a second modulation state 1*b*, e.g. with a switching rate of several thousand per second. In the example, a mirror M in the first modulation state 1*a* has a first tilt different to a second tilt of the second modulation state 1*b*. At least in the first modulation state 1*a*, a respective mirror M has a well-defined tilt angle.

Hence, impinging light 10 is reflected with a first angle in the first state 1*a* and with a different angle in the second state 1*b* by a respective micromirror M. This is indicated in the figure by the dashed arrows 11, representing light reflected by mirrors M in the first state 1*a*, whereas light 13 reflected by mirrors M in the second state 1*b* is reflected into a different direction. As the micromirrors M are equal and at least the first modulation state 1*a* is well defined, the first directions 11 are equal compared to each other, indicated in the figure by the parallelism of arrows 11. More generally spoken, at least two different redirections (in the example directions of reflection) for received modulated radiation 10 are provided by each of the individual modulator elements M of the spatial modulator array 1.

The first modulation state 1*a* is used to selectively redirect light 11 to one or more photo detectors 2, the detectors preferably having Gigahertz high-speed and/or intrinsic amplification (for simplicity, only one shown is in the figure), where it is detected. (Any possible optical elements as relay optics, light homogenizer and optical band pass filter in between prism 22 and detector 2 has been omitted, too, for better clarity of the figure). The detection signal is fed to a respective electronic detection channel 24, for evaluation by an evaluation electronics 23. Based on the detected signal and the principle of time of the flight, the distance to the object surface is determined. Said otherwise, according to the modulation state 1*a* or 1*b* a respective modulator element M of the modulator array 1 is, it either redirects received measurement light 10 such that it can be detected or it disables that received light 10 can be detected.

The micromirrors M of array 1 enable a scanning of an object surface on the receiving side in that by sequential switch of mirrors M into the first reflection state 1*a* and back, received measuring light 10 can be redirected mirror by mirror and so to say pixel by pixel towards the detectors 2. As the position of each mirror M within the array 1 is known, detected light redirected from a mirror M in the first modulation state 1*a* can be associated to a known measurement position and finally object point position. Hence, by a synchronized sequence of tilting (modulation state switch) of mirrors M, mirror after mirror, at well defined instances of time, measurement light 20 of one modulator/pixel M at a time is transmitted or redirected to a photodetector 2.

An advantage of this proposed solution is the reduction of background sunlight. As the actual reception field of view can be arbitrarily chosen and therefore reduced by the number of simultaneously enabled mirrors, the amount of background sunlight seen by the detectors is substantially reduced. Therefore, with a limited amount of emitting laser power the signal to noise ratio can be improved which leads to a higher precision and longer measurement ranges.

The time measurement unit of the LiDAR measures (pixel by pixel of the DMD array) the time of flight between emission and detection with a typical resolution of 1 picosecond. Thus, the distance of the object points defined by the receiving FOVs of the modulator elements or pixels M is determined with an accuracy of better than 1 mm.

With a DMD, e.g. 4096×2160 pixel or scan points can be selectively covered. Therewith, for instance, a "static" scanning—static in that the light receiving direction needs not to be changed—with a resolution of nearly 9 Mpoints within a field of view (FOV) e.g. of 80°×42°, 40°×21° or 20°×10.5°, defined by the focal length of the receiving optics and the modulator array size is enabled as a so to say "solid-state scan" (the spatial resolution in the object space equals the pixel size at the modulator array 1 divided by the effective focal length of the receiving optics 20; longer focal length provides a higher angular resolution, however, the full FOV becomes smaller). In case of a receiving FOV of 40°×21°, the spatial per pixel becomes 40°/4096=0.6 arcmin. Even at a distance of 100 m, the measurement points are still rather dense with a spacing of only 17 mm. Such a solid-state scan comprises e.g. a synchronized sequence of movement/switch of a line of micromirrors 1*a,b* such that there are well defined time points at which light of exactly one of the mirrors 1*a,b* directs light to the detector 2 and therewith covers one surface point of the measured object. In embodiments with a moving mirror in the transmitter as described above, the transmitter mirror and the modulator array 1 are arranged in a defined spatial relationship and operated in a synchronized manner, whereby demands on accuracy of the mirror resp. the transmitting beam shift are low, e.g. in case the illumination beam covers a slightly larger solid angle than the FOV-angle of the active spatial modulator element (pixel), there is even no need of measuring a deflection angle of the mirror/beam alignment.

Figure 3A:
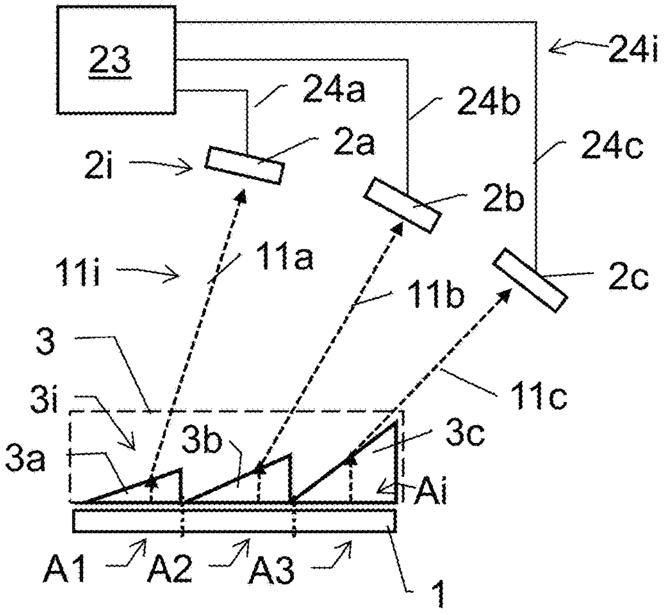
FIGS. 3*a,b*: show a LIDAR with a wedge array in a 2D-cross sectional view.
Figure 3B:
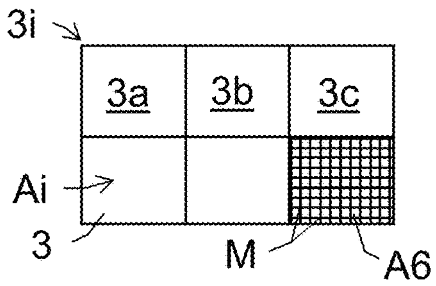

FIGS. 3*a* and 3*b* show a further development of the LIDAR in a 2D-cross sectional or side view (FIG. 3*a*) resp. in a top view (FIG. 3*b*). For better clarity, in contrast to FIG. 1*a*, even more elements have been omitted, namely the receiving optics, the beam deflection element (prism), depicting the array 1 of spatial light modulator elements M in FIG. 3*a* as a whole and only indicating the single modulator elements M in a part of FIG. 3*b*, and detectors 2*i* as well as the evaluation unit 23 in FIG. 2.

As depicted, in this embodiment, the device comprises an additional dense array 3 of optical wedges 3*i*. The wedge array 3 is for example an assembly of transparent prisms which each cause light refraction in a defined and different direction, wherein the beam entrance plane and the exit plane are not parallel but have different angles, whereby the difference is small, e.g. 1°-5° or 10° at most. Preferably, the wedge array 3 is monolithic and for example manufactured from plastic or made of glass and arranged in between the modulator array 1 and the detectors 2*i*, on top of the modulator array 1, therewith in any case the first optical element after the modulator array 1 and close to the focal plane of the receiving optics (cf. FIG. 1). The wedge array 3 on its own together with the modulator domains Ai covered by each wedge is schematically shown in a birds eye view in FIG. 3*b*. Thereby, the number i of wedges, detectors 2*i* and domains of spatial light modulator elements—the number is e.g. between 3 and 12, in the example the number i=6—is equal as further described in the following.

The dense wedge array 3 covers the modulator array 1 and comprises different wedges 3*i*, of which in the side view FIG. 3*a* three wedges 3*a*-3*c* are depicted, in the top view FIG. 3*b* six wedges are depicted (of which the three wedges 3*a*-3*c* are denoted). The wedges 3*i* are juxtaposed gapless in (a plane parallel to) the focal plane. Hence, each wedge 3*i* covers and therewith defines a different area Ai of the modulator array 1—of which in side view FIG. 3*a* three areas A1, A2, A3 are indicated by dotted separation lines and in top view FIG. 3*b* one area A6 is marked schematically by a pattern indicating the micromirros M contained in this domain A6—or different regions of the intermediate image plane (as the modulator array 1 is arranged in the focal plane which is a good approximation of the image plane of a measured object (e.g. object 31 in FIG. 1). The wedges 3*i* are different with respect to the refractive angle provided or said otherwise their refractive planes are differently oriented, as indicated in the figure, thus as illustrated the reflected beams 11*i* of the modulator array are refracted in a number i of different directions equal to the number i of wedges 3*i*, in the example six beams and six different directions, of which in the side view of FIG. 3*a* three beams/directions 11*a*, 11*b*, 11*c* are schematically depicted.

Thus, light reflected or redirected from the array of the spatial light modulator 1 is refracted area-wise in different directions in space, which is indicated in the figure by arrows 11*a*-11*c* pointing in different directions. Hence, in contrast to the embodiment according to FIG. 2, though all modulator elements M are equal resp. provide equal spatial light redirection in the first modulation state, the final light propagation direction of light originating from the modulator array 1 is different for different areas or regions Ai of the modulator array 1.

In other words, due to the different wedges 3*i* of the wedge array 3, subarrays or domains Ai of the modulator array 1 are defined and provided with finally different angles of reflection for the same modulation state for modulator elements M not within the same subarray Ai. For each subarray Ai in this embodiment there is a separate detector 2*i* (in the example with six wedges, defining six subarrays, there are six detectors) arranged and oriented according to the respective (one of the exemplary six) effective redirection direction or refraction direction 11*a*-11*c* and coupled to the LiDAR evaluation unit 23, providing an according number (here: six) of detection channels 24*a*-24*c*.

Due to the area-wise spatial separation of the reflected beam-cones of received measurement light or splitting the optical axis of the primary receiver optics 20 into a set of for instance 3×2 different optical axes at the dense modulator array 1 by the dense wedge array 3, the detectors 2*i* can be arranged spatially separated from each other, with a distance in between them. The wedge array 3 enables more possibilities for detector arrangement and is in particular advantageous in that detectors 2I can be applied that have a non-sensitive edge zone. For example avalanche photo diodes (APDs) show "dead areas" at their border wherefore in case of a dense detector assembly of APDs as would be needed without the wedge array 3, there would be detections gaps and not all "pixels" of the dense array 1 of modulator elements M would be "imaged". Preferably in an embodiment as shown, an actual detection area or usable photo sensitive zone of a detector 2*a*-*c* is substantially equal to a respective modulator area A1-3 (hence, any possible relay optics in between at the end leaves the optical size unchanged resp. has a magnification factor of 1). For example, for a DMD-chip of an overall size of 6 mm×9 mm, each modulator area Ai and accordingly a respective of the six detection areas has a size of 3 mm×3 mm.

A respective detection channel 24*i* receives at a time signals from one of the modulator elements M in the first modulation state of a respective array area Ai allocated to a respected detector 24*i*, e.g. domain A1 (provided by wedge 3*a*)—detector 2*a*-channel 24*a*. Thereby, the bandwidth is at least 100 Mhz or at least 1 GHz, thus enabling distance measurement with an accuracy in the millimetre or submillimeter range. The modulator elements M of different areas Ai can be activated independently and simultaneously for different areas Ai, hence, a scanning in parallel for multiple/all areas Ai or multiple parallel detection channels 24*i* is enabled. In the example, six spatial modulator elements M (one pixel of each region Ai) can be simultaneously be switched into their first modulation state for redirecting measurement light towards a respective detector 2*i* and therewith six objects points can be measured at once. This parallelisation of modulators and detection channels allows for a multiplication of the measurement rate; for instance with a DMD 1 with a micromirror switch rate of 50 kHz, a six fold measurement rate of 300 kpoints/sec is provided. For example, the detection channels 24*i* are connected to a thresholding electronics (comparator, Schmitt trigger), FPGA or AD-converters via a multiplexer as a channel selector such that multiple or all channels 24*i* can be switched on in parallel. For instance, a 6:3 MUX can connect six detectors to three ADCs or FPGA ports. Alternatively, the detectors 2*i* can be e.g. connected directly to an equivalent number of ADC-channels.

Fast switching DMD yield a pixel or switching speed of 2.5 microseconds, e.g. the time from the 1$^{st}$ modulation state to the 2$^{nd}$ modulation state. The transition from the 2$^{nd}$ to the 1$^{st}$ modulation state is also actively steered by an opposite electronical control signal and achieving the same high switching speed. Because of ringing and settle down time, the feasible ON-time or shutter time is 8 microseconds, this yields a highest achievable point to point measurement is ⅛ μs=125 kPts/s when using a single channel ranging setup.

Figure 4:
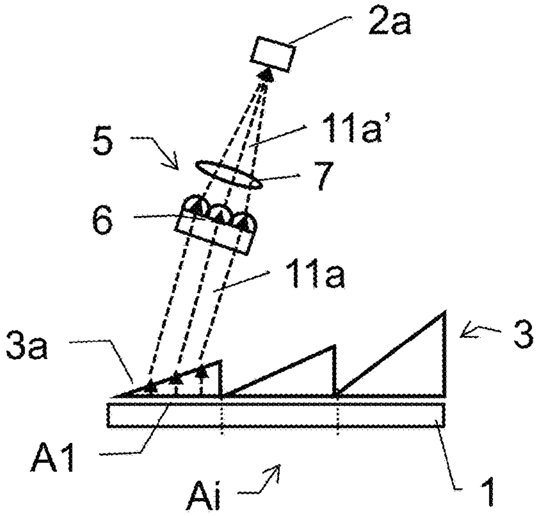
FIG. 4: shows a further development of the LIDAR with an array of spatial modulators and an array of wedges.

FIG. 4 shows a further development of the LIDAR with an array 1 of spatial modulator elements and an array of wedges 3 with different tilts of the refractive planes. FIG. 4 resembles FIG. 3*a* in a simplified manner. Again, light from a modulator area Ai is differently refracted by different wedges of array 3. For better clarity, the light path is shown only for one wedge 3*a* resp. one modulator area A1, however the following applies for all modulator areas Ai. In this embodiment, light refracted in same direction 11 by wedge 3*a* impinges on a lens array 6, the lens array 6 being part of a relay optics 5 (which in the example comprises a further single lens or an achromatic doublet 7 for collimation).

The array of lenses 6 is designed in such a way that each sublens of the lens array 6 maps the modulator area A1 versus the center of the photodetector 2*a*, indicated in the figure by converging directions 11*a*' in direction of detector 2*a*. This arrangement images the reflected light bundles 11*a* of a modulator area A1 to a smaller area in the photodetector plane. As a result, the detection area needed for covering the whole of a modulator area Ai is reduced, for instance the photo sensitive area can be at least ten times smaller than the modulator area Ai to be covered. Thus, relatively small detectors 2*a* can be used, e.g. an APD with a diameter of below 0.5 mm.

Figure 5:
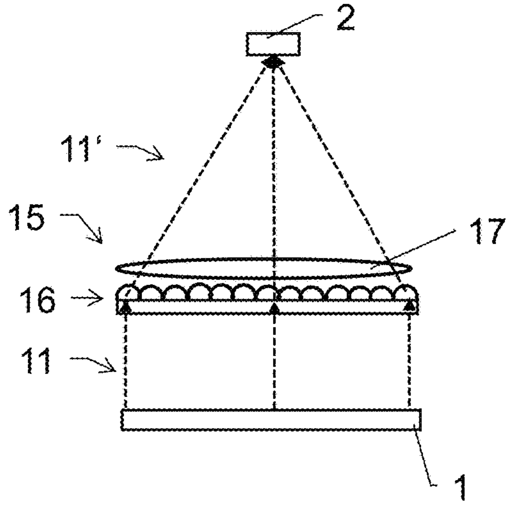
FIG. 5: shows a LIDAR in simplified scheme with a lens array.

FIG. 5 shows schematically an alternative, single channel LIDAR device whereby as in the previous figures for sake of simplicity, most parts of the LIDAR has been omitted. Depicted is the modulator array 1 in simplified form which—if a respective modulator is in its first modulation state-redirects light (indicated by arrows 11) received from the receiving optics by independent modulator elements versus a detector 2 which feeds a single detection channel 24. In this exemplary embodiment, a lens array 16 is arranged in between the modulator array 1 and detector 2, the detector 2 being for example embodied as an APD, MPPC (Multi Photon Pixel Counter) or SiPM (Silicon Photo Multiplier). In the example, the lens array 16 is part of a relay optics 15, having a further collimation optics 17, e.g. an achromat of high numerical aperture. The array of lenses 16 serves for concentrating the spot in the detectorplane of detector reducing the footprint of all impinging rays at the photodetector 2. Due to the fact that the light bundles 11 representing a cone of rays reflected by the respective modulator elements, e.g. DMD-pixels, do not fill the complete aperture of the relay optics 15, the redirected light bundles 11 can be imaged to a small area in the detection plane without loss of light by the shown multiple lenses in a spatial lateral arrangement. Hence, distinct patches of pixels are imaged on a same area or region on the detector 2, indicated in the figure by arrows 11' (with loss of spatial resolution in the photodetector plane). Every single lens of array of lenses 16 maps the modulator area versus the center of the photodetector. The reduction of the spotsize in the detector plane depends on the size or the pitch of the single lens of the lens array 16. The optimum diameter of an array-lens should be comparably to the diameter of the reflected light cone from a single pixel of the DMD-modulator. The angle of a light cone can be shaped by the numerical aperture of the receiving lens 20. Since the spatial resolution of the LiDAR is defined by the pixel of the DMD-modulator, this non-bijectiv mapping of the pixels onto the photodetetorplane does not reduce the angular resolution of the LiDAR. In summary, spatial resolution remains high and the area of the photodetector needed for signal detection is drastically reduced, wherefore for example a medium-sized APD or MPPC with e.g. a diameter of 350 μm to 1.5 mm can be applied.

Figure 6A:
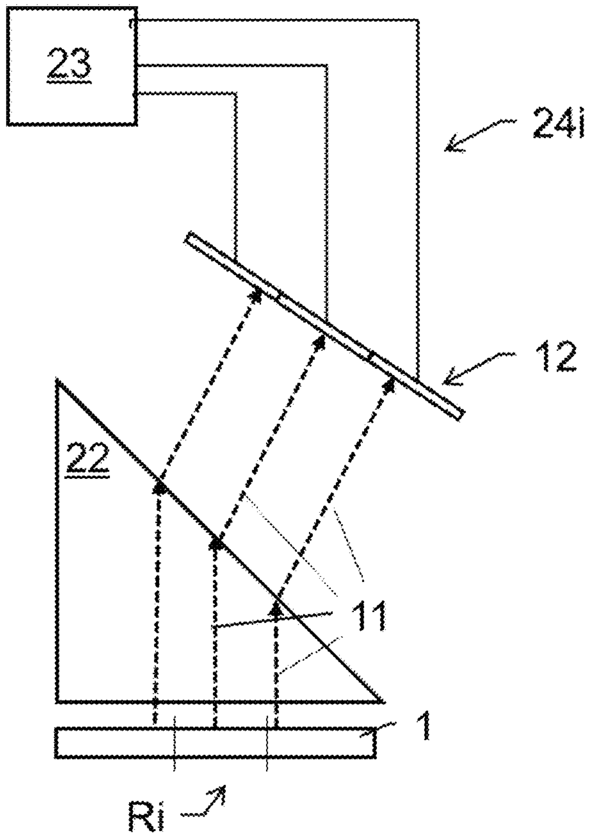
FIGS. 6*a,b*: show a LIDAR in simplified scheme with a segmented photodetector.
Figure 6B:
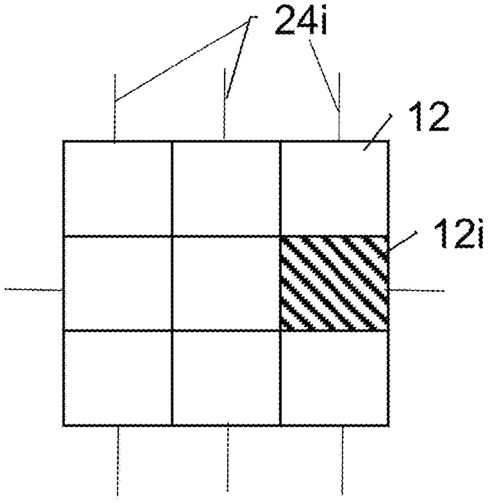

FIGS. 6*a* and 6*b* show another alternative embodiment where the redirected light is sensed by a single and monolithic dense detection array 12 (as opposed to multiple detection arrays in previous descriptions), whereby as in the previous figures for sake of simplicity, most parts of the LIDAR have been omitted. As shown in side view FIG. 6*a*, light redirected from a respective modulator element, e.g. one of the DMD-micromirrors, of the modulator array 1 passes through prism 22 (and if applicable through a relay optics, in particular with a 1:2 or 1:5 demagnification) in a respective direction 11 for detection. In the example, the redirected light is sensed by a single and monolithic dense detection array 12, comprising an array of single detectors, for example an array of MPPC (Multi Photon Pixel Counter) or an array of SiPM. Also a segmented single-chip silicon APD or a monolithic array of InGaAs-APDs can be used as a basis.

The dense detection array 12, e.g. segmented MMPC, is shown in FIG. 6*b* in a top view and comprises in the example 3×3 neighbored detection regions 12*i*, each (of the size 3 mm×3 mm) covering an according region Ri of the spatial modulator array 1. Each detector 12*i* of detector array 12 can be separately connected to the evaluation electronics 23, hence, in the example nine detection channels 24*i* are available. If not a full parallelization (synchronous measurement of all channels 24*i*) is wanted, for example, the detection channels 24*i* are connected to a thresholding electronics (comparator, Schmitt trigger), FPGA or AD-converters via a multiplexer as a channel selector.

Thus, nine spatial modulator elements (one of each region Ri covered by one detection region 12*i*) can simultaneously be switched into their first modulation state for redirecting measurement light towards detector 12 and therewith nine object points can be measured at once by nine parallel measurement channels 24*i*. This parallelisation of modulators and detection channels allows for a multiplication of the measurement rate.

Figure 7:
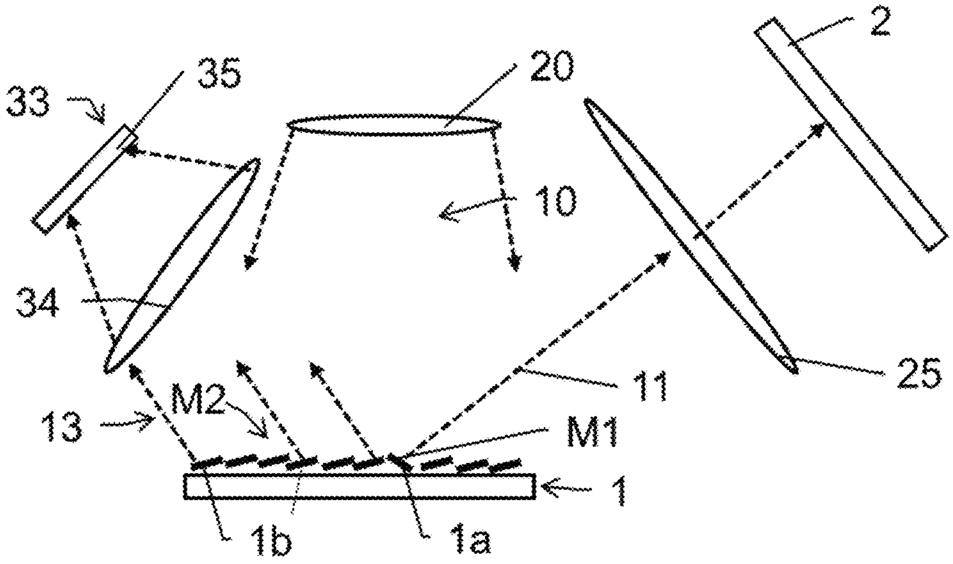
FIG. 7: shows a LIDAR in simplified scheme with an additional camera.

FIG. 7 shows in a cross sectional/side view a further development, again in a strongly simplified fashion. Depicted is the modulator array 1 with one of the set of structurally equal spatial modulator elements, denoted M1 in the figure, being in the first state 1*a* for redirecting light 10 impinging via receiving optics 20 in a first direction 11 via a relay optics 25 to a detector 2 for the LIDAR measurement as in principle described above. The relay optics 25 is for example arranged according to the Scheimpflug condition. The other spatial modulator elements, denoted M2 in the figure, are in the second state 1*b* which is spatially well defined. Light impinging a modulator pixel M2 in the second state 1*b* is redirected in the second direction 13 towards a camera 33, e.g. an intensity, gray-scale, near infrared or RGB-camera, indicated in the figure by imaging optics 34 and image sensor 35 (CMOS chip). Of course, in a variation to the depicted distribution, also a number of elements M1 equal to the available multiple detectors, resp. an element M1 of each of the respective modulator domains or regions as described above can be in their first state 1*a* and the rest of the elements M2 in the second state 1*b*.

That is, all modulator elements M2 in the second state or "non-measurement" state 1*b* redirect received light to the camera sensor 35. Hence, an image of the field of view of the LIDAR device can be generated by the camera 33 (except for the pixel(s) M1 in the first, measurement state 1*a*, of course). Therewith, for example a live 2D-image can be recorded or displayed to a user during scanning, in parallel to the distance measurements. Another relevant advantage is the access of a coaxial 2D-image to the recorded 3D-point cloud of the targeted object surface.

Figure 8:
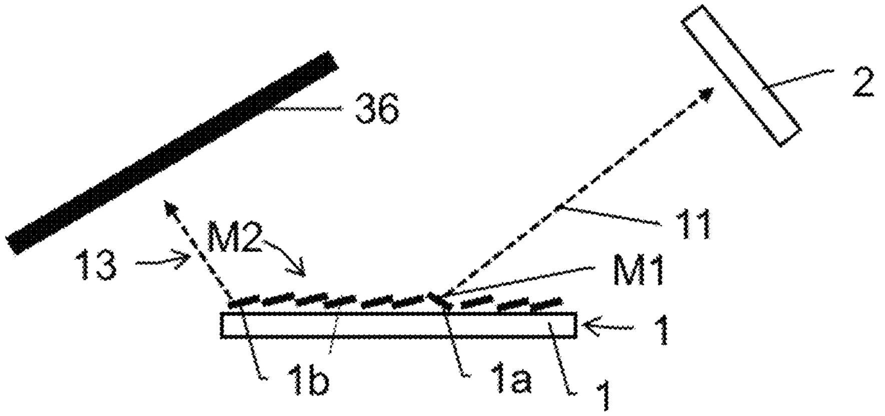
FIG. 8: shows a LIDAR in simplified scheme with means for stray light absorption.

FIG. 8 shows in a cross sectional/side view another further development, again in a strongly simplified fashion. Again, the modulator array 1 with one modulator element M1 in the first state 1*a* for redirecting light 11 towards the photodetector(s) 2 is depicted. Further, in the example, the device comprises a means 36 for the absorption of light not contributing to the received light within the FOV of the pixel 1*a*, e.g. a black glass plate representing a volume absorber or beam dump.

The optical absorber 36 is arranged in such a way that light impinging at modulator elements M2 in a second modulation state 1*b*—or alternatively a third modulation state—is directed towards it (arrows 13) and absorbed from it. Thus, laser light impinging on all other pixels outside of pixel 1*a* and solar light and secondary produced straylight within the LIDAR is reduced, leading to a reduced noise and crosstalk to the activated channel defined by pixel 1*a*. Said otherwise, the absorber 36 is positioned such that all light currently not used for measuring is absorbed.

The mentioned further, non-first and non-second, modulation state is for example in case of a DMD as modulator array a so called parked-position or in-plane position. Such spatial modulator elements then have for example two actively controlled well-defined modulation states with well-defined angular orientation-whereby the first state 1*a* is used for scanning and the second state 1*b* e.g. can be used for 2D-imaging as described above- and a third state without operational current and without any well-defined orientation. In particular in case of (micro-)mirrors as spatial modulators, leaving any mirror not actively used in such a parked position is advantageously as in this state fewest stray light is generated. The absorber can also be arranged and designed in such a way that not only in the parked position but both in the second and third modulation state light is absorbed. In the same way, also sunlight collected by the receiving lens 20 (cf. FIGS. 1 and 2) is absorbed which leads to a reduced noise of the measured distance. Further noise reduction can e.g. be provided by an optical interference filter, e.g. arranged in front of the modulator array 1, blocking all spectral ranges besides the measurement wavelength, and/or using buffles or blinds.

Figure 9:
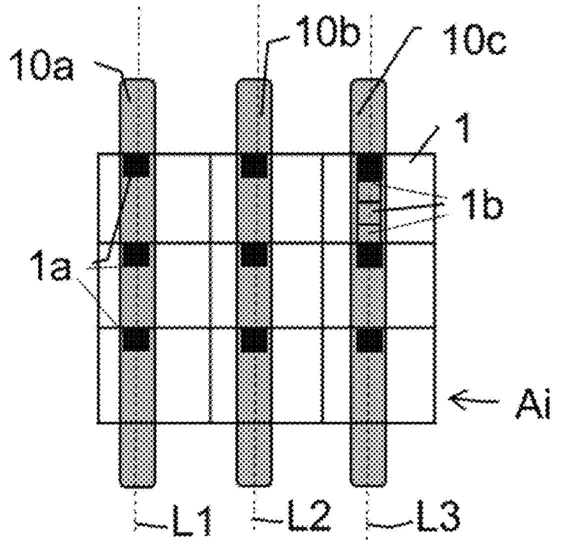
FIG. 9: shows a LIDAR in simplified scheme with synchronized light fan illumination.

FIG. 9 illustrates schematically a method of illumination of an object's surface and therewith of the modulator array 1. In this embodiment, the light transmitter of the LIDAR (cf. FIG. 1) is designed to emit illumination light in form of multiple light fans 10*a-c* spaced to each other. For example, the light fans are provided by multiple line lasers, multiple linear VCSEL-arrays (Vertical Cavity Surface Emitting Laser) or a grating or diffractive optical element for beam splitting in the emitting beam path. Thereby, the arrangement is such that the light fans 10*a-c* are oriented according to lines L1-L3 of spatial modulator elements as for instance depicted in the figure.

Hence, after reflection at the object surface, the received light fans illuminate not the full FOV of the receiver/the complete modulator array 1, but only a respective line L1-L3 of spatial modulator elements of the modulator array 1. In the example, there are three light fans 10*a-c*, illuminating an array 1 portioned into nine areas Ai, e.g. assigned to optical wedges as described above, whereby each light fan 10*a-c* covers three areas Ai "vertically". Of each modulator area Ai, one modulator element or pixel is in the first or measurement state 1*a* at a time. In sequence, the further pixels in the second state 1*b* of the currently illuminated line L1-L3 are activated or switched into the first state 1*a* and back, in parallel for all currently illuminated lines L1-L3, until all pixels of the current scanning line L1-L3 have been detected. Then, the light fans 10*a-c* switch spatially to the "horizontally" neighbored modulator lines or next set of modulator lines, e.g. by activating a next line of VCSEL of the array or next line lasers, and the modulator elements of these next, "horizontally" neighbored modulator lines are sequentially used for scanning as described by switching into the first state 1*a*. This procedure is repeated until all modulator elements or pixels (all modulator lines or the whole of each modulator region Ai) have been illuminated and used for measuring by light redirection to the detectors.

Said otherwise, subsegments of the receiving FOV are illuminated in series or sequentially by activation or shift of illumination synchronized to the activation within lines of spatial modulators L1-L3, whereby multiple spaced subsegments are illuminated and multiple modulator lines L1-L3 are active preferably in parallel or alternatively in sequence by the multiple light fans 10*a-c*. For example, the illumination can be implemented by eight laser diodes with an optics for shaping a pattern of three horizontal(ly spaced)

light fans 10*a-c* per laser diode. Hence, the emitted light fans 10*a-c* cover the current viewing or receiving solid angles of multiple modulators in the scanning state 1*a*. Such a design is in particular advantageous for long measurement ranges of above 100 m, particularly for a measurement wavelength of 1064 nm, 1310 nm or 1550 nm. The fan-like illumination of the environment to be measured is of higher intensity compared to a flash-like illumination of the complete FOV of the LiDAR-receiver, e.g as 80°×42° 40°×21°, or 20°×10.5°.

A skilled person is aware of the fact that details, which are here shown and explained with respect to different embodiments, can also be combined in other permutations if not indicated otherwise.

The invention claimed is:

1. A Light Detection And Ranging (LIDAR) device for detection of a portion of a three dimensional environment, in particular for ranges of above 100 m, comprising:

a transmission unit with a sequential or simultaneous pulse or burst illumination source, a receiver unit comprising:

a receiving optics, multiple detectors for detection of received illumination light and feed of respective detection channels, a dense array of equal spatial light modulator elements being arranged in a focal plane of the receiving optics between the receiving optics and the detectors, whereby:

the spatial light modulator elements provide a first spatial modulation state and a second spatial modulation state each, the two states differing in light redirection, and the array of spatial light modulator elements and the detectors are arranged such that only in the first modulation state light from the receiving optics is redirected via a respective spatial light modulator element in a targeted manner towards a detector, an evaluation electronics for evaluation of signals of respective detection channels for distance determination based on the principle of time of flight, wherein the receiver unit comprises a dense array of optical wedges in between the array of spatial light modulator elements and the detectors, whereby:

the wedges are juxtaposed with respect to the focal plane, each wedge covers a different area of the array of spatial light modulator elements and their refractive planes are differently oriented, such that light coming from spatial light modulator elements in the first modulation state is refracted area-wise in different refraction directions.

2. The LIDAR device according to claim 1, wherein the dense array of spatial light modulator elements is embodied as a digital micromirror device.

3. The LIDAR device according to claim 1, wherein the detectors are spatially separated from each other according to a respective refraction direction each such that light of a respective modulator area is receivable by a respective detector.

4. The LIDAR device according to claim 1, wherein the illumination is in the wavelength range between 1000 nm and 2000 nm, in particular has a wavelength of 1064 nm, 1310 nm or 1550 nm.

5. The LIDAR device according to claim 1, wherein a respective detector is embodied as an avalanche photo diode.

6. The LIDAR device according to claim 1, wherein a respective detector has an electronic bandwidth of at least 100 MHz, in particular at least 1 GHz.

7. The LIDAR device according to claim 1, wherein a photo sensitive area of a respective detector is substantially covering the same field of view as a respective one of said areas of the array of spatial light modulator elements.

8. The LIDAR device according to claim 1, comprising lens arrays for mapping the respective one of said areas of the array of spatial light modulator elements versus the center of the detector.

9. The LIDAR device according to claim 8, wherein a photosensitive area of a respective detector is at least ten times smaller than the respective area of the array of spatial light modulator elements, in particular whereby the photosensitive area has a diameter of 350 μm at most.

10. The LIDAR device according to claim 1, wherein the array of optical wedges is the first optical element in the light path between the array of spatial light modulator elements and the detectors.

11. The LIDAR device according to claim 1, wherein the device comprises a camera with an image sensor, whereby in the second modulation state a respective spatial light modulator element directs light from the receiving optics to the image sensor.

12. The LIDAR device according to claim 1, wherein the device comprises means for light absorption, in particular a beam dump, for absorbing light redirected by a spatial light modulator element in the second modulation state and/or a further modulation state.

13. The LIDAR device according to claim 1, wherein multiple detection channels are arranged parallel and the evaluation electronics is configured for parallel distance determination.

14. The LIDAR device according to claim 1, wherein all detection channels are arranged parallel and the evaluation electronics is configured for parallel distance determination.

15. The LIDAR device according to claim 1, wherein the transmission unit comprises means for emitting the illumination in form of multiple light fans spaced to each other and oriented in accordance to lines of the modulator elements.

16. The LIDAR device according to claim 15, whereby the means for emitting the illumination comprise one or more of:

a grating or diffractive optical element, multiple line lasers, arrays of VCSELs.

17. The LIDAR device according to claim 1, wherein the receiving optics and the array of spatial light modulator elements define a field of view of at most 40°×21°.

18. The LIDAR device according to claim 1, wherein the receiving optics and the array of spatial light modulator elements define a field of view of at most 20°×10.5°.

* * * * *